United States Patent
Fujikawa et al.

(10) Patent No.: US 6,492,742 B1
(45) Date of Patent: Dec. 10, 2002

(54) ELECTRIC TORQUE CONVERTER MOUNTED ON PARALLEL HYBRID VEHICLE

(75) Inventors: Masato Fujikawa, Shizuoka (JP); Yasuo Sumi, Kanagawa (JP); Kenji Nakashima, Shizuoka (JP)

(73) Assignee: JATCO TransTechnology, Ltd., Fuji (JP)

( * ) Notice: Subject to any disclaimer, the term of this patent is extended or adjusted under 35 U.S.C. 154(b) by 0 days.

(21) Appl. No.: 09/688,109

(22) Filed: Oct. 16, 2000

(30) Foreign Application Priority Data

Oct. 19, 1999 (JP) .......................... 11-296512

(51) Int. Cl.$^7$ .................... B60L 11/02; B61C 9/38; P02M 11/06; H02P 9/04; B60K 1/00; B60K 6/00; B60K 16/00; B60K 8/00
(52) U.S. Cl. ............. 290/40 C; 180/65.2; 180/65.1; 180/65.3; 475/5
(58) Field of Search ............... 290/45, 40 C; 180/65.2; 318/139; 475/5, 7, 151, 149

(56) References Cited

U.S. PATENT DOCUMENTS

| | | | | |
|---|---|---|---|---|
| 5,508,924 A | * | 4/1996 | Yamashita | 364/426.03 |
| 5,513,719 A | * | 5/1996 | Moroto et al. | 180/65.4 |
| 5,744,895 A | * | 4/1998 | Seguchi et al. | 310/266 |
| 5,856,709 A | * | 1/1999 | Ibaraki et al. | 290/45 |
| 5,903,061 A | * | 5/1999 | Tsuzuki et al. | 290/40 C |
| 5,934,395 A | * | 8/1999 | Koide et al. | 180/65.2 |
| 6,048,288 A | * | 4/2000 | Tsujii et al. | 477/5 |
| RE36,678 E | * | 5/2000 | Moroto et al. | 180/65.4 |
| 6,073,713 A | * | 6/2000 | Brandenburg et al. | 180/65.2 |
| 6,155,364 A | * | 12/2000 | Nagano et al. | 180/65.2 |

FOREIGN PATENT DOCUMENTS

JP 9-226392 9/1997

* cited by examiner

Primary Examiner—Nestor Ramirez
Assistant Examiner—Julio C. Gonzalez
(74) Attorney, Agent, or Firm—Foley & Lardner

(57) ABSTRACT

An electric torque converter mounted on a parallel hybrid vehicle employing a parallel hybrid system, using both an internal combustion engine and an electric motor for propulsion, includes an electric motor generator having a motor generator rotor and a motor generator stator coil, and a composition-and-distribution mechanism located between the engine and a transmission for combining torque produced by the engine and torque produced by the motor generator with each other and for mechanically distributing the torque produced by the engine into the motor generator and a transmission input shaft. A converter case includes a third casing member formed with a boss portion supporting a rotating member of the composition-and-distribution mechanism by a bearing, and partitioning the motor generator from the composition-and-distribution mechanism. Also provided is a rotor support including a substantially cylindrical outer support portion supporting thereon the motor generator rotor, a substantially cylindrical inner support portion whose inner periphery is fixedly connected to the rotating member, and a connection portion interconnecting the inner and outer support portions. A locknut is located on the outer periphery of the rotating member and mates with a first one of axial ends of the substantially cylindrical inner support portion, for pre-loading the bearing via the rotor support. A position sensor includes a resolver rotor located on the inner periphery of the substantially cylindrical outer support portion, and a resolver stator located on the outer periphery of the boss portion.

7 Claims, 4 Drawing Sheets

ELECTRIC TORQUE CONVERTER MOUNTED ON PARALLEL HYBRID VEHICLE

BACKGROUND OF THE INVENTION

1. Field of the Invention

The present invention relates to an electric torque converter used in an automatic transmission and mounted on a hybrid vehicle employing a parallel hybrid system, using both an internal combustion engine and an electric motor (an electric motor generator) for vehicle propulsion.

2. Description of the Prior Art

In recent years, it is strongly desired to improve fuel economy of automotive vehicles, for the purpose of protecting global atmospheric and saving earth resources. In order to reduce fuel consumption, there have been proposed and developed various hybrid vehicles. Hybrid vehicles in which an internal combustion engine and an electric motor (an electric motor/generator), both serving as a propelling power source, are arranged in series to each other or in parallel with each other, and operate at various running modes, such as a motor-propelled vehicle driving mode, an engine-propelled vehicle driving mode, a regenerative mode, a power-assist mode, an electric power generation mode, and the like. For example, during the power-assist mode, the engine (a primary power source) is assisted by the electric motor (a secondary power source). Also, when the hybrid vehicle is decelerating, the hybrid system operates at the regenerative mode during which the electric motor is employed to convert kinetic energy of the vehicle into electric energy and to regenerate electricity which is stored in a car battery. One such parallel hybrid system has been disclosed in Japanese Patent Provisional Publication No. 9-226392. FIG. 4 shows a development cross-sectional view of the parallel hybrid system disclosed in the Japanese Patent Provisional Publication No. 9-226392. As shown in FIG. 4, rotational motion of a crankshaft of an internal combustion engine is input into a composition/distribution mechanism 103 capable of mechanically combining two different forces, that is, torque produced by the engine and torque produced by the motor/generator, with each other, and of mechanically distributing the torque produced by the engine properly. Electricity is generated by rotating a first motor generator 102 (mainly serving as an electric generator) connected to the composition/distribution mechanism 103. During the power assist mode (or the torque assist mode) or during the motor-propelled vehicle driving mode, torque (driving force) produced by a second motor generator 101 (mainly serving as an electric motor) is input into the composition/distribution mechanism 103. During vehicle deceleration, the first motor generator 102 also functions to regenerate braking energy (electricity) which is stored in the battery. The electricity regenerated and stored in the car battery can be reused for the torque-assist operating mode or the motor-propelled vehicle driving mode.

In order to efficiently travel the hybrid vehicle, it is necessary to accurately recognize or detect vehicle operating conditions such as a vehicle traveling state, and to select or use the power source suitable for the vehicle traveling state recognized, or to execute efficiently the electric power generation mode or the regenerative mode. For the reasons set forth above, it is important to achieve accurate motor generator rotation control (i.e., accurate motor generator rotational speed control). As information needed for the motor generator rotation control, input information from a revolution sensor (or a rotational position sensor) is often used. In the hybrid system as disclosed in the Japanese Patent Provisional Publication No. 9-226392, a resolver 105 is provided for detecting the rotational position (rotor angle) of the first motor generator 102 (mainly serving as the generator), while a resolver 104 is provided for detecting the rotational position (rotor angle) of the second motor generator 101 (mainly serving as the motor). The basic principle of each of the resolvers 104 and 105 is similar to that of an electric motor. That is, the rotational position of the motor generator is sensed or detected by monitoring or reading an electromotive force produced by rotation of the motor generator rotor.

SUMMARY OF THE INVENTION

However, in the parallel hybrid system disclosed shown in FIG. 4, the resolver 105 for the first motor generator 102 is arranged in close proximity to a stator coil of the first motor generator 102, and also part of flux of magnetic force produced by the stator coil tends to undesiredly spread or escape in the transverse direction of the stator coil. Therefore, the accuracy that detects the rotational position of the first motor generator resolver 105 is lowered owing to the magnetic flux partially spreading in the transverse direction. Regarding the second motor generator resolver 104, the resolver is accommodated in a resolver chamber separated from a motor generator chamber for the second motor generator 101 to prevent the resolver 104 from being affected by electromagnetic wave noise produced by the motor generator 101. Thus, a resolver cover for the resolver 104 must be individually installed or mounted on the motor housing of the motor generator 101, thereby increasing the number of parts of the system, and thus resulting in an increased man-hour for installation of the resolver on the motor housing.

Accordingly, it is an object of the invention to provide an electric torque converter mounted on a parallel hybrid vehicle, which avoids the aforementioned disadvantages of the prior art.

It is another object of the invention to provide an electric torque converter mounted on a parallel hybrid vehicle employing a parallel hybrid system, which can accurately detect the rotational position of an electric motor generator (electric motor/generator) by means of a resolver, while preventing the resolver from being affected by undesirable electromagnetic wave noise produced by a stator coil of the motor generator.

In order to accomplish the aforementioned and other objects of the present invention, an electric torque converter mounted on a parallel hybrid vehicle employing a parallel hybrid system, using both an internal combustion engine and an electric motor for propulsion, said electric torque converter comprises an electric motor generator having a motor generator rotor and a motor generator stator coil, a composition-and-distribution mechanism adapted to be located between the engine and a transmission for mechanically combining torque produced by the engine and torque produced by the motor generator with each other and for mechanically distributing the torque produced by the engine into the motor generator and a transmission input shaft of the transmission, the composition-and-distribution mechanism having a rotating member arranged coaxially with the transmission input shaft, a converter case which comprises a casing member formed with a boss portion supporting the rotating member of the composition-and-distribution mechanism by a bearing member, and partitioning the motor generator from the composition-and-distribution mechanism, a rotor support which comprises a substantially cylindrical outer support portion supporting thereon the motor generator rotor, a substantially cylindrical inner support portion whose inner periphery is fixedly connected to the rotating member, and a connection portion interconnecting the substantially cylindrical outer support portion and the substantially cylindrical inner support portion, a locknut located on an outer periphery of the rotating member and mating with a first one of axial ends of the substantially cylindrical inner support portion of the rotor support, for pre-loading the bearing member via the rotor support, and a position sensor which comprises a resolver rotor located on an inner periphery of the substantially cylindrical outer support portion, and a resolver stator located on an outer periphery of the boss portion of the casing member. It is preferable that the substantially cylindrical inner support portion of the rotor support has internal splines, and the rotating member has external splines formed on the outer periphery thereof, and that spline-connection between the internal splines and the external splines is established by screwing the locknut onto the external thread portion of the rotating member so that the locknut is tightened up onto the first axial end of the substantially cylindrical inner support portion of the rotor support, and that the second axial end of the substantially cylindrical inner support portion is abutted-engagement with the inner race of the bearing member while applying pre-load to the bearing member. More preferably, the electric torque converter may further comprise a torque converter input shaft arranged coaxially with the transmission input shaft, and also the rotor support, the motor generator, and the position sensor are arranged concentrically with the torque converter input shaft, so that the motor generator rotor is located on the outer periphery of the substantially cylindrical outer support portion of the rotor support, and that the motor generator stator coil is radially spaced apart from the resolver rotor via the motor generator rotor.

DESCRIPTION OF THE PREFERRED EMBODIMENTS

Figure 1:
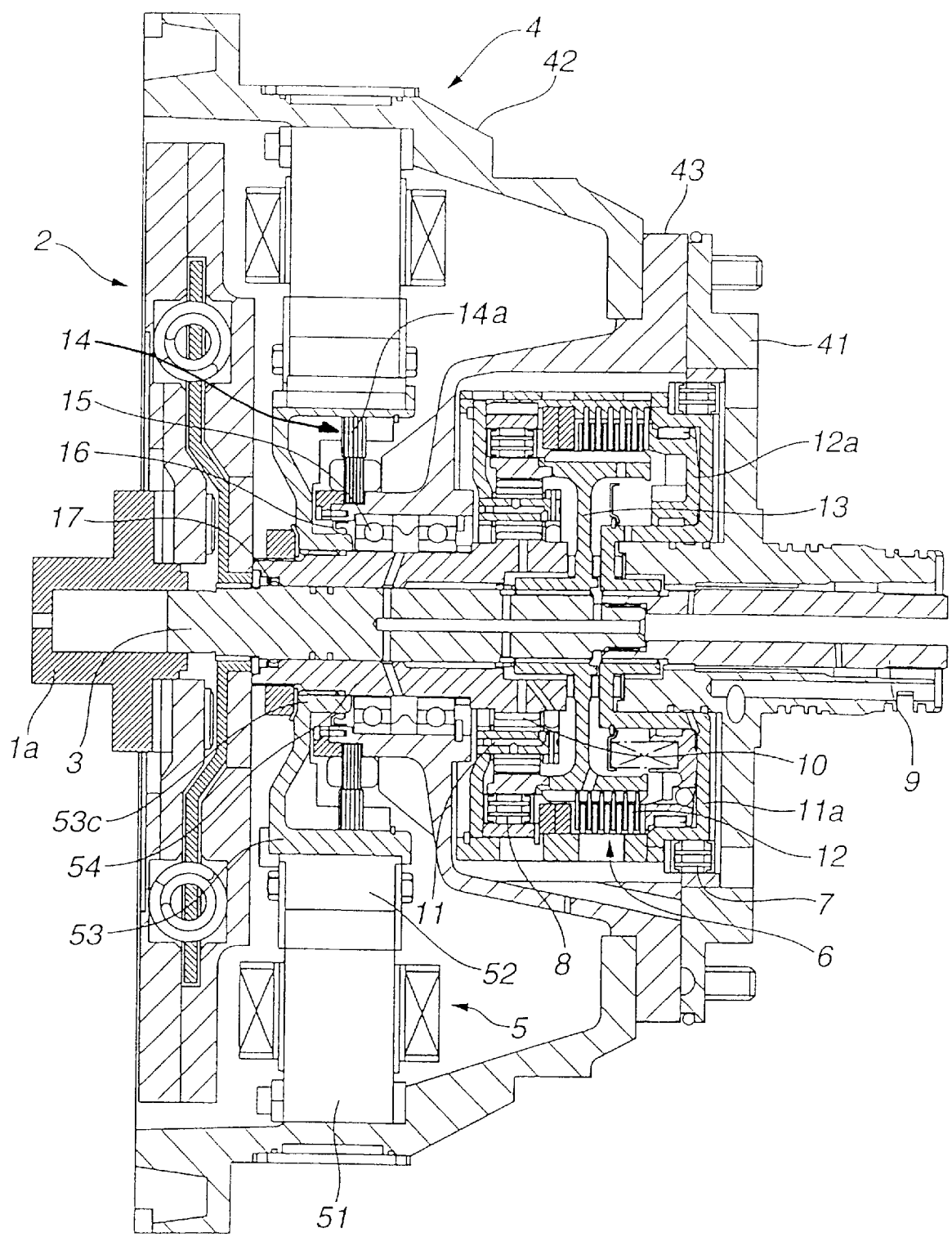
FIG. 1 is a longitudinal cross-sectional view illustrating an embodiment of an electric torque converter.
Figure 2:
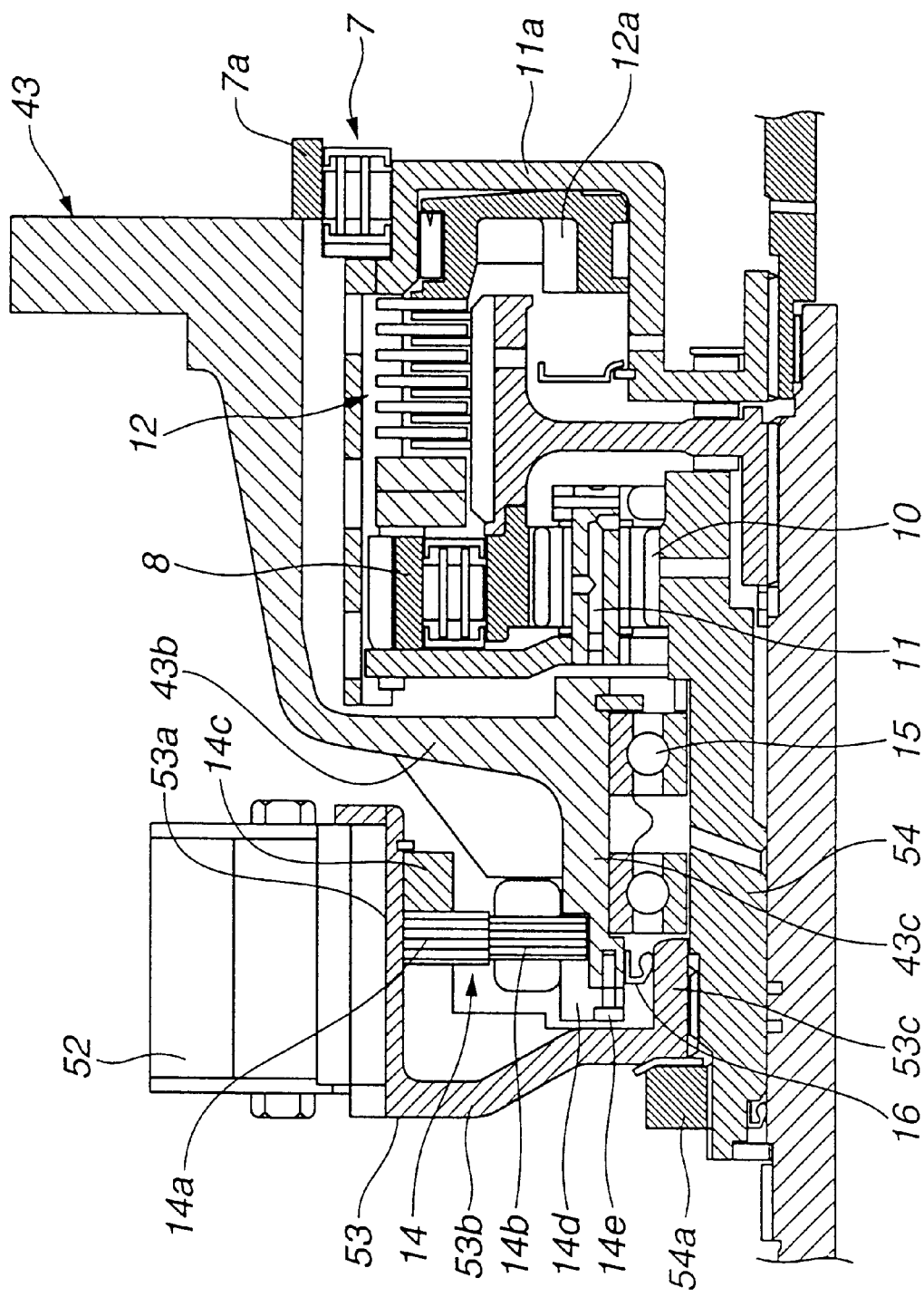
FIG. 2 is a partly-enlarged cross-sectional view showing details of a third casing member of the electric torque converter of the embodiment.

Referring now to the drawings, an electric torque converter 4 of the invention is exemplified in a parallel hybrid system. As seen from the right-hand side of FIG. 1, a damper 2 is fixedly connected to the flanged end of an engine output shaft 1a by means of bolts. By way of spline-connection between external splines of an electric torque converter input shaft 3 and internal splines of the damper 2, the converter input shaft 3 is connected via the damper 2 to the engine output shaft 1a. As illustrated in the substantially central portion of the cross section of FIG. 1, a ring gear 13 is splined to the electric torque converter input shaft 3. A converter case of the electric torque converter 4 is comprised of a first casing member 41, a second casing member 42, and a third casing member 43. The first casing member 41 is bolted to a transmission case (not shown). The second casing member 42 is bolted to both the transmission case and the engine. A boss portion 43c of the third casing member 43 rotatably supports a rotating member 54 of a composition/distribution mechanism 6 (described later) via a ball bearing 15. A rotor support 53 is splined to the rotating member 54. In order to tighten the rotor support 53 on the spline-connection portion of the rotating member 54 and to restrict axial motion of the ball bearing 15, a locknut 54a is screwed tight onto the left-hand end (viewing FIGS. 1 and 2) of the rotating member 54. In this manner, by tightening the spline-connection portion between the rotor support 53 and the rotating member 54 by way of the locknut 54a, the relative axial motion between the third casing member 43 and the rotor support 53 is prevented. A motor generator rotor 52 is supported on a substantially cylindrical outer support portion 53a of the rotor support 53. Sun gear 10 is formed on the outer periphery of the rotating member 54. As shown in FIGS. 1 and 2, a revolution sensor 14 is provided between the outer periphery of the third casing member 43 and the rotor support 53. A boss-shaped drum support portion (not numbered) of the first casing member 41 functions to support both transmission input shaft 9 and drum 11a. A pinion carrier 11 is connected to the transmission input shaft 9 via the drum 11a. The first casing member 41 is formed therein with a plurality of oil passages, to supply hydraulic pressure to a piston 12a and thus to engage a clutch 12. The clutch 12 and the piston 12a are provided in an internal space defined in the drum 11a, such that the clutch 12 is engaged with the ring gear 13 by one axial movement of the piston 12a and disengaged from the ring gear by the opposite axial movement of the piston 12a. A one-way clutch 8 is also provided in the internal space defined in the drum 11a, so as to inhibit reverse rotation of the ring gear 13. Furthermore, a one-way clutch 7 is disposed between the drum 11a and the first casing member 41, so as to inhibit reverse rotation of the drum 11a. In other words, the one-way clutch 7 is disposed between the transmission input shaft 9 and the composition/distribution mechanism denoted by reference sign 6 so as to inhibit reverse rotation of the transmission input shaft 9. The one-way clutch 7 has an outer race 7a, an inner race (not numbered) fixed to the drum 11a, and an engaging unit disposed between the inner and outer races for inhibiting the transmission input shaft 9 from rotating backward during reaction and for allowing it to rotate forward freely when reaction is no longer required. The composition/distribution mechanism 6 is located inside of the third casing member 43, for mechanically combining two different forces, that is, torque produced by the engine and torque produced by the motor generator, with each other, and of mechanically distributing the torque produced by the engine into the motor generator and the transmission input shaft. In the electric torque converter of the shown embodiment, the aforementioned composition/distribution mechanism 6 includes the rotating member 54, and a planetary gear system having the central sun gear 10, the pinion carrier 11, and planet pinions surrounding the sun gear 10. An oil seal 16 is placed around a substantially cylindrical inner support portion 53c of the rotor support 53 to prevent oil leakage between the rotor support 53 and the third casing member 43. In a similar manner, an oil seal 17 is placed around the rotating torque converter input shaft 3 to prevent oil between the rotating member 54 and the torque converter input shaft 3. Although it is not clearly shown in the drawings, O ring (not numbered) is also placed between mating faces of the second and third casing members 42 and 43 to prevent oil leakage from the connecting portion between the second and third casing members. By the use of these seals and O rings, the converter case of the electric torque converter 4 is divided into a dry chamber (that is, a motor generator chamber) and an oil chamber (that is, a composition/distribution mechanism chamber).

Figure 3:
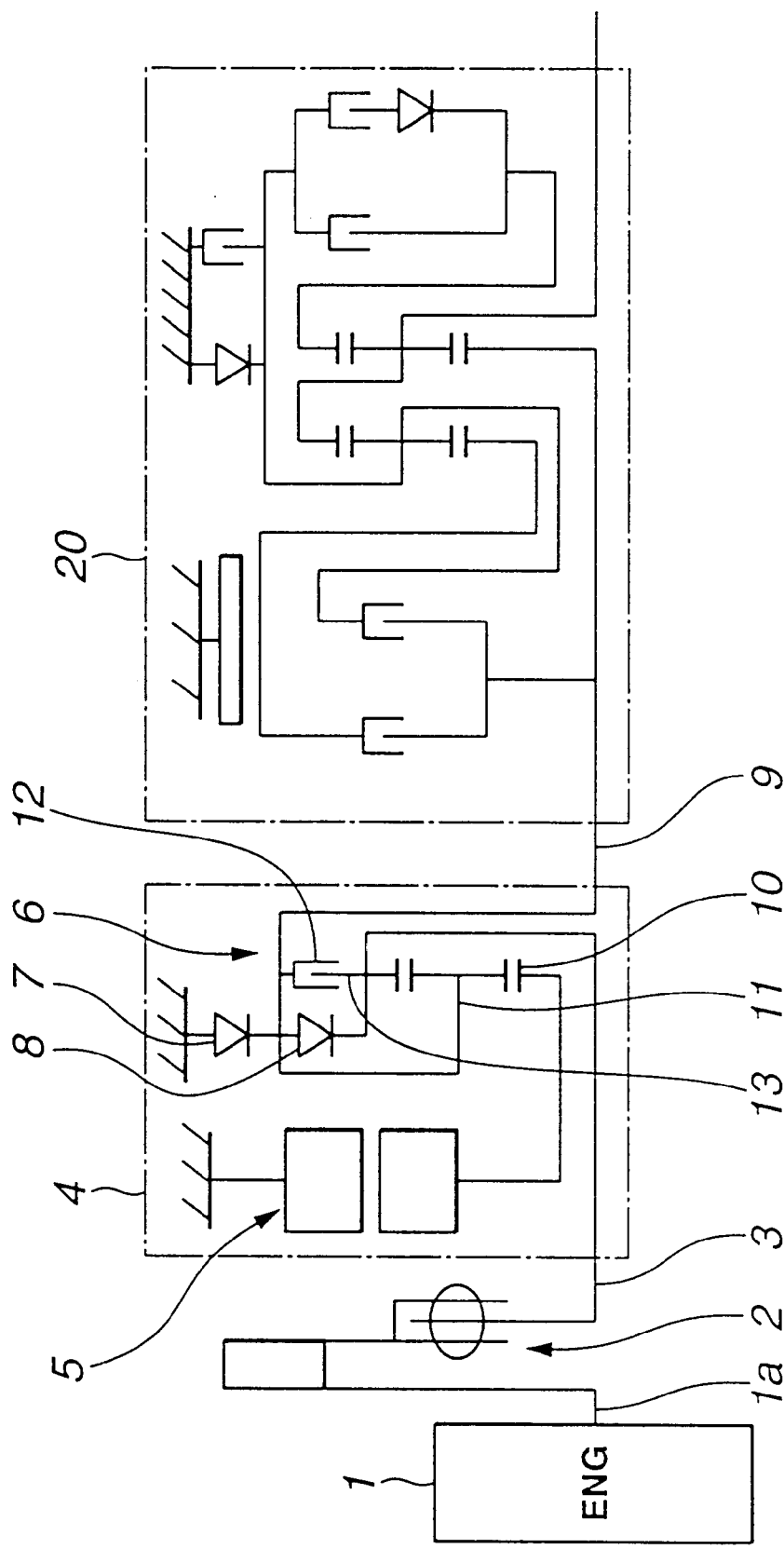
FIG. 3 is a simplified skeleton diagram of the parallel hybrid system incorporating the electric torque converter of the embodiment.
Figure 4:
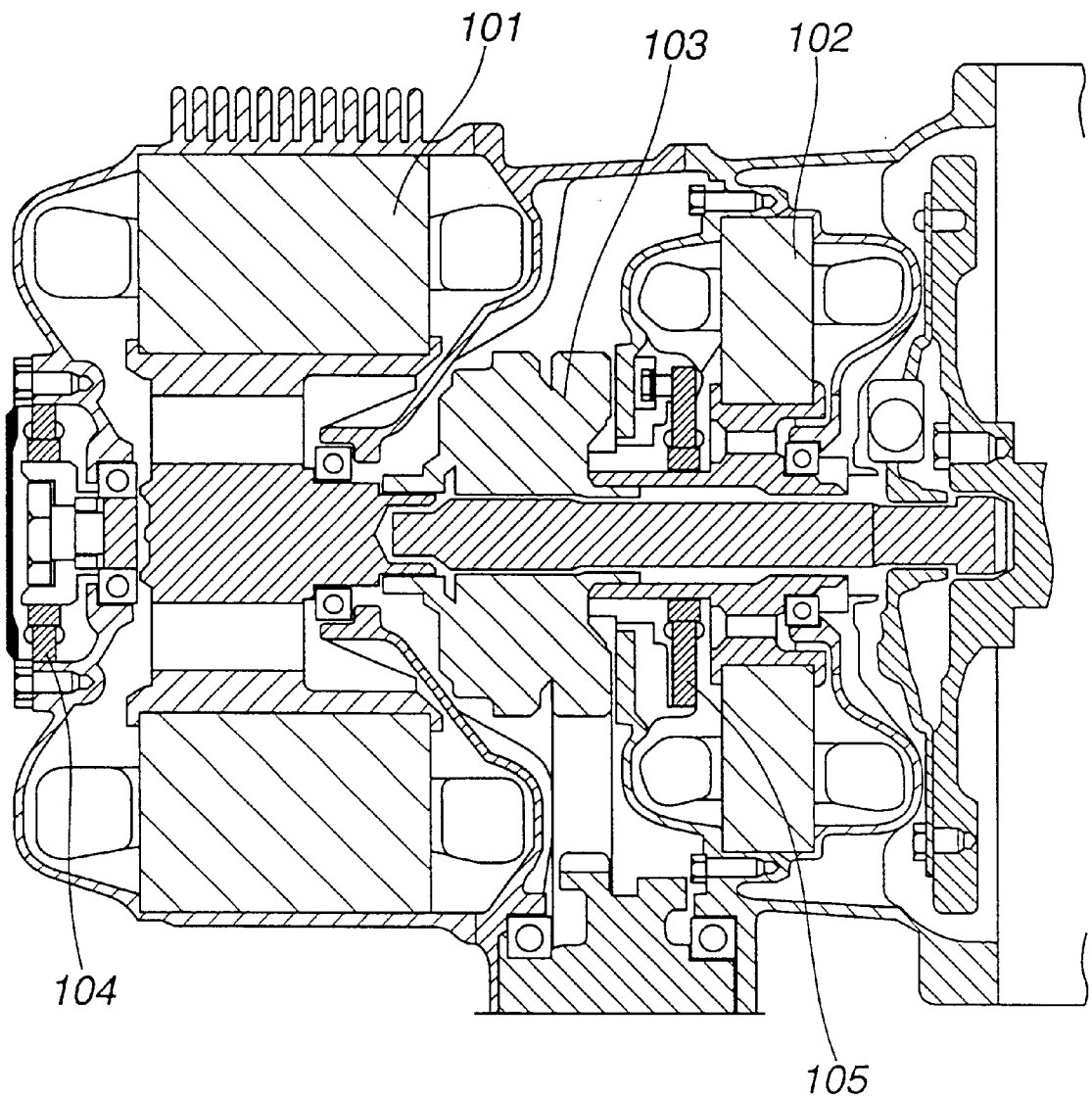
FIG. 4 is a development cross-sectional view showing the location of a resolver incorporated in the prior art parallel hybrid system.

Referring now to FIG. 3, there is shown the skeleton diagram of the parallel hybrid system on which the electric torque converter 4 of the embodiment is mounted. During engine start-up, the motor generator 5 is driven in the reverse-rotation direction as a starter motor.

The term "reverse rotation" of the motor generator means a rotational direction opposite to the rotational direction of the engine, whereas the term "normal rotation" of the motor generator means the same rotational direction as the engine. At this time, the engine is started up under a specified condition where the rotational motion of the pinion carrier 11 is stopped by means of the one-way clutch 7, while the ring gear 13 is rotated in the normal-rotation direction. On the other hand, when the transmission 20 is maintained at its neutral gear range position N in which no driving torque is transmitted, the engine may be started up by driving the motor generator in the normal-rotation direction with the clutch 12 engaged.

During the starting period, the engine is started or propelled by producing motor torque by the motor generator 5, so that the motor torque value is suitable for torque output of the engine 1. Concretely, the rotational-speed difference between the engine 1 and the motor generator 5 is gradually reduced, while smoothly increasing the rotational speed of the pinion carrier 11. When the rotational-speed difference is reduced to below a predetermined small value, the clutch 12 is engaged, and thus the starting operation is completed. After the starting operation has been completed, in the same manner as a lock-up state of a usual hydraulic torque converter with a lock-up clutch, the parallel hybrid vehicle is propelled or driven in a directly-coupled state where the engine output shaft 1*a* is coupled directly with the transmission input shaft 9. In the directly-coupled state, as occasion demands, the power-assist mode or the electric power generation mode is selected. When the vehicle is decelerating, the motor generator 5 is operated at the regenerative braking mode, for energy regeneration (that is, recovery of kinetic energy of the vehicle in the form of electric energy).

Referring now to FIG. 2, there is shown the enlarged cross section of the essential part of the electric torque converter 4 of the embodiment. As shown in FIG. 2, the revolution sensor 14 is provided between the outer periphery of the third casing member 43 and the rotor support 53. In the electrical torque converter of the embodiment, the revolution sensor or rotational position sensor 14 is comprised of a resolver. The revolution sensor 14 is constructed by a sensor rotor 14*a* mounted on the rotor support 53 and a sensor stator 14*b* mounted on the third casing member 43. Revolution of an electric motor generator 5, such as an angular position of the motor generator, is detected by reading revolution of the sensor rotor 14*a*, such as rotor angle, by means of the sensor stator 14*b*. As can be seen from FIG. 1, the revolution sensor 14 is located between the inner periphery of the rotor 52 and the outer periphery of the third casing member 43. Therefore, it is possible to effectively suppress the revolution sensor 14 from being affected by electromagnetic wave noise produced by the motor generator 5. In a similar manner as the motor generator, the revolution sensor 14 is constructed by combining an electromagnetic coil and a magnet. Thus, assuming that the revolution sensor 14 is located close to a stator 51 (that is, a stator coil) of the motor generator 5, there is an increased tendency for the revolution sensor 14 to be affected by changes in magnetic field of the stator 51 (stator coil). In this case, it is impossible to accurately detect the rotation angle of the motor generator 5. To avoid this, as discussed above, the revolution sensor 14 is provided between the inner periphery of the motor generator rotor 52 and the outer periphery of the third casing member 43. As seen from FIG. 2, the sensor rotor 14*a* is splined to the rotor support 53. The sensor rotor 14*a* is fixed onto the substantially cylindrical outer support portion 53*a* of the rotor support 53 by way of press-fitting of a rotor sleeve 14*c* and/or by the use of a snap ring (not numbered). Also, the sensor stator 14*b* is fixedly supported onto the boss portion 43*c* of the third casing member 43 by tightening a stator holder 14*d* onto the extremity of the boss portion 43*c* by means of bolts 14*e*. As described previously, the relative axial motion of the rotor support 53 to the third casing member 43 is prevented by means of the locknut 54*a*, and thus relative axial motion between the sensor rotor 14*a* and the sensor stator 14*b* is simultaneously restricted or prevented. With the revolution sensor arrangement discussed above, it is possible to enhance the accuracy of detection of the revolution sensor 14.

As best seen in FIG. 2, the third casing member 43, partitioning the motor generator 5 from the composition/distribution mechanism 6, includes the boss portion 43*c* which supports the rotating member 54 of the composition/distribution mechanism 6 via the radial ball bearing 15, and a flanged portion 43*b* extending from one axial end of the boss portion 43*c* in a direction substantially perpendicular to the axial direction of the boss portion (that is, the axial direction of the torque converter input shaft 3). On the other hand, the rotor support 53 includes the substantially cylindrical outer support portion 53*a* supporting thereon the motor generator rotor 52, the substantially cylindrical inner support portion 53*c* having internal splines brought into spline-connection with external splines of the rotating member 54, and a substantially radially-extending side wall portion (simply, a connection portion) 53*b* interconnecting the outer and inner support portions 53*a* and 53*c*. Additionally, the locknut 54*a* is located on the outer periphery of the rotating member 54 (exactly, screwed onto the external thread portion of the rotating member 54) in such a manner as to mate with the other axial end of the inner support portion 53*c* of the rotor support 53. Actually, spline-connection between the internal splines of the substantially cylindrical inner support portion 53*c* and the external splines of the outer periphery of the rotating member 54 is established and completed by screwing the locknut 54*a* onto the external thread portion of the rotating member 54 so that the locknut 54*a* is tightened up onto a first one of both axial ends of the substantially cylindrical inner support portion 53*c* of the rotor support 53, and that the second axial end of the substantially cylindrical inner support portion 53*c* is abutted-engagement with the inner race of the bearing member 15 while applying pre-load to the bearing member. As a result, the side wall of the ball bearing 15, in particular the side wall of the inner race of the ball bearing 15, is pre-loaded via the rotor support 53 by means of the locknut 54*a* screwed onto the rotating member 54, because the rightward axial motion of the outer race of the ball bearing 15 is restricted by means of a retaining ring (not numbered) such as a C-shaped retaining ring. That is to say, the locknut 54a, the inner support portion 53c, and the retaining ring cooperate with each other to retain the ball bearing 15 in place. In other words, by virtue of the pre-load applied to the ball bearing 15, undesired play (undesired rattling motion) of the rotor support 53 can be minimized or prevented, thus enhancing the positioning accuracy for the resolver rotor 14a of the revolution sensor 14. Furthermore, in the electric torque converter 4 of the embodiment, the revolution sensor 14 includes the resolver rotor 14b which is located on the inner periphery of the outer support portion 53a of the rotor support 53, and the resolver stator 14b which is located on the outer periphery of the boss portion 43c of the third casing member 43. In more detail, the torque converter input shaft 3 is arranged coaxially with the transmission input shaft 9, and also the rotor support 53, the motor generator 5, and the revolution sensor 14 are arranged concentrically with the torque converter input shaft 3, and additionally the motor generator rotor 52 is located on the outer periphery of the substantially cylindrical outer support portion 53a of the rotor support 53, and thus the motor generator stator coil 51 is radially spaced apart from the resolver rotor 14a via the motor generator rotor 52. Therefore, it is possible to efficiently lay out the revolution sensor (the rotational position sensor) 14 within a limited internal space defined between the boss portion 43c of the third casing member 43 and the substantially cylindrical outer support portion 53a of the rotor support 53. As can be appreciated from the cross-sectional views of FIGS. 1 and 2, within such an internal space, the motor generator resolver, that is, the revolution sensor 14 is scarcely affected by the flux of magnetic force produced by the stator coil 51 of the motor generator 5. Additionally, the motor generator resolver 14 can be placed at a position suitably adequately spaced apart from the stator coil 51 of the motor generator 5. Thus, it is possible to effectively reliably suppress the revolution sensor 14 from being affected by electromagnetic wave noise produced by the stator coil 51 of the motor generator. That is, with the improved lay-out of the revolution sensor 14 discussed above, it is possible to accurately detect the rotational position or angular position of the motor generator 5 incorporated in the parallel hybrid system without lowering the accuracy of detection of the revolution sensor 14. According to the construction of the electric torque converter of the embodiment, there is no necessity of a sensor cover, such as a resolver cover hitherto needed to define an individual revolution sensor accommodation chamber for the sensor 14. This reduces the number of parts of the hybrid system, thereby ensuring a reduced man-hour for installation of the revolution sensor on the converter case. Therefore, the position detection accuracy of the sensor 14 can be greatly enhanced.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electric torque converter mounted on a parallel hybrid vehicle employing a parallel hybrid system, using both an internal combustion engine and an electric motor for propulsion, said electric torque converter comprising:
    an electric motor generator having a motor generator rotor and a motor generator stator coil;
    a composition-and-distribution mechanism adapted to be located between the engine and a transmission for mechanically combining torque produced by the engine and torque produced by the motor generator with each other and for mechanically distributing the torque produced by the engine into the motor generator and a transmission input shaft of the transmission, said composition-and-distribution mechanism having a rotating member arranged coaxially with the transmission input shaft;
    a converter case comprising:
        a casing member including
            (a) a boss portion supporting the rotating member of the composition-and-distribution mechanism by a bearing member that is located on an inner periphery of the boss portion, and
            (b) a flanged portion extending from one axial end of the boss portion in a direction substantially perpendicular to an axial direction of the boss portion, the flanged portion and the boss portion cooperating with each other to separate the motor generator from the composition-and-distribution mechanism;
    a rotor support comprising:
        (a) a substantially cylindrical outer support portion supporting thereon the motor generator rotor,
        (b) a substantially cylindrical inner support portion whose inner periphery is fixedly connected to the rotating member, and
        (c) a substantially radially-extending side wall portion integrally formed between the substantially cylindrical outer support portion and the substantially cylindrical inner support portion;
    a locknut located on an outer periphery of the rotating member and mating with a first one of axial ends of the substantially cylindrical inner support portion of the rotor support, for pre-loading the bearing member via the rotor support; and
    a position sensor disposed between an inner periphery of the motor generator rotor and an outer periphery of the casing member, said sensor comprising:
        (a) a sensor rotor located on an inner periphery of the substantially cylindrical outer support portion, and
        (b) sensor stator located on an outer periphery of the boss portion of the casing member; and wherein:
        the substantially cylindrical outer support portion, the substantially radially-extending side wall portion, the boss portion, and the flanged portion cooperate with each other to form an electromagnetic shield for the position sensor.

2. The electric torque converter as claimed in claim 1, wherein the substantially cylindrical inner support portion of the rotor support has internal splines, and the rotating member has external splines formed on the outer periphery thereof, and a spline-connection between the internal splines and the external splines is established by screwing the locknut onto an external thread portion of the rotating member so that the locknut is tightened up onto the first axial end of the substantially cylindrical inner support portion of the rotor support, and that the second axial end of the substantially cylindrical inner support portion is brought into abutted-engagement with an inner race of the bearing member while applying pre-load to the bearing member.

3. The electric torque converter as claimed in claim 1, which further comprises a torque converter input shaft arranged coaxially with the transmission input shaft, and wherein the rotor support, the motor generator and the position sensor are arranged concentrically with the torque converter input shaft, so that the motor generator rotor is located on the outer periphery of the substantially cylindrical outer support portion of the rotor support, and that the motor generator stator coil is radially spaced apart from the position sensor rotor via the motor generator rotor.

4. An electric torque converter mounted on a parallel hybrid vehicle employing a parallel hybrid system, using both an internal combustion engine and an electric motor for propulsion, said electric torque converter comprising:

an electric motor generator having a motor generator rotor and a motor generator stator coil;

a composition-and-distribution mechanism adapted to be located between the engine and a transmission for mechanically combining torque produced by the engine and torque produced by the motor generator with each other and for mechanically distributing the torque produced by the engine into the motor generator and a transmission input shaft of the transmission, said composition-and-distribution mechanism having a rotating member arranged coaxially with the transmission input shaft;

a converter case comprising:
  a casing member including:
    a) a boss portion supporting the rotating member of the composition-and distribution mechanism by a bearing member, and
    b) a flanged portion extending from one axial end of the boss portion in a direction substantially perpendicular to an axial direction of the boss portion, the flanged portion and the boss portion cooperating with each other to partition the motor generator from the composition-and-distribution mechanism;

a rotor support comprising:
  a) substantially cylindrical outer support portion supporting thereon the motor generator rotor,
  b) a substantially cylindrical inner support portion whose inner periphery is fixedly connected to the rotating member, and
  c) a substantially radially-extending side wall portion integrally formed between the substantially cylindrical outer support portion and the substantially cylindrical inner support portion;

a revolution sensor comprising:
  a) a sensor rotor fixedly connected onto an inner periphery of the substantially cylindrical outer support portion, and
  b) a sensor stator located on an outer periphery of the boss portion of the casing member;

a locknut located on an outer periphery of the rotating member and mating with a first one of axial ends of the substantially cylindrical inner support portion of the rotor support, for pre-loading the bearing member via the rotor support, and for enhancing a positioning accuracy of the sensor rotor fixedly connected to the rotor support, and for enhancing an accuracy of detection of the revolution sensor; and wherein the substantially cylindrical outer support portion, the substantially cylindrical portion, the substantially radially-extending side wall portion, the boss portion, and the flanged portion cooperate with each other to form an electromagnetic shield for the revolution sensor.

5. The electric torque converter as claimed in claim 4, which further comprises a rotor sleeve press-fitted to the inner periphery of the substantially cylindrical outer support portion to fix the sensor rotor onto the substantially cylindrical outer support portion of the rotor support, and a stator holder tightened onto an extremity of the boss portion to fix the sensor stator onto the boss portion.

6. The electric torque converter as claimed in claim 1, wherein: a first radially-extending surface of the sensor rotor faces the inner periphery of the substantially radially-extending side wall portion, and a second radially-extending surface of the sensor rotor faces the flanged portion of the casing member and located inside of an axial end of the substantially cylindrical outer support portion facing the flanged portion.

7. The electric torque converter as claimed in claim 4, wherein: a first radially-extending surface of the sensor rotor faces the inner periphery of the substantially radially-extending side wall portion, and a second radially-extending surface of the sensor rotor faces the flanged portion of the casing member and is located inside of an axial end of the substantially cylindrical outer support portion facing the flanged portion.

* * * * *